(12) United States Patent
Aisa

(10) Patent No.: US 10,822,003 B2
(45) Date of Patent: Nov. 3, 2020

(54) MAGNETIC RAIL SHUNT WITH VARIABLE RESISTOR

(71) Applicant: ALSTOM Transport Technologies, Saint-Ouen (FR)

(72) Inventor: Pier-Alessandro Aisa, Bologne (IT)

(73) Assignee: ALSTOM Transport Technologies, Saint-Ouen (FR)

( * ) Notice: Subject to any disclaimer, the term of this patent is extended or adjusted under 35 U.S.C. 154(b) by 414 days.

(21) Appl. No.: 15/790,881

(22) Filed: Oct. 23, 2017

(65) Prior Publication Data

US 2018/0111632 A1    Apr. 26, 2018

(30) Foreign Application Priority Data

Oct. 24, 2016  (EP) ..................................... 16306390

(51) Int. Cl.
| | | |
|---|---|---|
| *B61L 1/18* | (2006.01) | |
| *B61L 27/00* | (2006.01) | |
| *B61L 1/20* | (2006.01) | |
| *B61L 1/02* | (2006.01) | |
| *H01R 13/62* | (2006.01) | |
| *B60M 5/00* | (2006.01) | |

(52) U.S. Cl.
CPC .................. *B61L 1/18* (2013.01); *B61L 1/025* (2013.01); *B61L 1/20* (2013.01); *B61L 27/0088* (2013.01); *H01R 13/6205* (2013.01); *B60M 5/00* (2013.01)

(58) Field of Classification Search
CPC ............. B60M 5/00; B60M 5/02; E01B 11/54
See application file for complete search history.

(56) References Cited

U.S. PATENT DOCUMENTS

| | | | | |
|---|---|---|---|---|
| 1,843,501 A | * | 2/1932 | Baldwin .................. | B60M 5/00 238/14.1 |
| 2,795,442 A | * | 6/1957 | Wilson ..................... | B60M 5/00 403/202 |
| 2,830,768 A | * | 4/1958 | Boaz ........................ | B60M 5/00 238/14.05 |
| 5,538,174 A | * | 7/1996 | Gaman .................... | B60M 5/00 164/54 |
| 7,298,136 B1 | * | 11/2007 | Curtis ................ | G01R 31/2834 324/754.03 |
| 2006/0032933 A1 | * | 2/2006 | Reichle .................... | B60M 1/30 238/14.05 |

(Continued)

OTHER PUBLICATIONS

Extended European Search Report dated May 4, 2017 in corresponding EP Application No. 16306390.2.

*Primary Examiner* — Jason C Smith

(74) *Attorney, Agent, or Firm* — Knobbe, Martens, Olson & Bear, LLP

(57) ABSTRACT

A magnetically clampable rail shunt (1) comprising two magnetic clamps (10), each clamp having a magnetic device for attaching the clamp to one of two parallel railway rails (R1, R2) of a railway track by magnetic force, and an electrical conductor (20) electrically connecting the two magnetic clamps (10) for shunting the two parallel railway rails. The rail shunt (1) is characterised by a variable electrical resistor assembly (30) for adjusting the electrical resistance of the rail shunt (1), said variable electrical resistor assembly (30) being connected in series between the two magnetic clamps (10) via said electrical conductor (20). Preferred application to testing of track circuits.

15 Claims, 2 Drawing Sheets

(56) References Cited

U.S. PATENT DOCUMENTS

| | | | |
|---|---|---|---|
| 2010/0219256 A1* | 9/2010 | Williams | B60M 5/00 |
| | | | 238/14.05 |
| 2016/0090113 A1* | 3/2016 | Nagrodsky | B61L 23/04 |
| | | | 246/34 R |
| 2017/0327137 A1* | 11/2017 | Aisa | B61L 1/18 |
| 2018/0111632 A1* | 4/2018 | Aisa | B61L 1/18 |

* cited by examiner

MAGNETIC RAIL SHUNT WITH VARIABLE RESISTOR

CROSS-REFERENCE TO RELATED APPLICATION

This application claims priority to European Patent Application No. EP 16306390.2 filed on Oct. 24, 2016, the disclosure of which including the specification, the drawings, and the claims is hereby incorporated by reference in its entirety.

FIELD OF THE INVENTION

The present invention concerns a magnetically clampable rail shunt comprising two magnetic clamps, each clamp having a magnetic device for attaching the clamp to one of two parallel railway rails of a railway track by magnetic force, and an electrical conductor electrically connecting the two magnetic clamps for shunting the two parallel railway rails.

BACKGROUND OF THE INVENTION

Such a rail shunt is known from FIG. 7 and § § 24 and 25 of document US 2010/0219256 A1. § 25 describes a non-illustrated variant, which provides two shunts in one shunt apparatus. In this variant, the ends of two electrical cables are both coupled to one magnetic rail attachment assembly 760. The other end of each of those cables is coupled to a separate magnetic rail attachment assembly. Each cable has a different electrical resistance, such as 0.0 Ohm and 0.06 Ohm. By choosing one of the cables, the user can choose between two values for the electrical resistance of the rail shunt.

It would however be desirable to provide a rail shunt with an increased choice of possible resistance values. At the same time, the rail shunt should not become too unwieldy.

SUMMARY OF THE INVENTION

This object is achieved with the above-defined rail shunt with a variable electrical resistor assembly for adjusting the electrical resistance of the rail shunt, said variable electrical resistor assembly being connected in series between the two magnetic clamps via said electrical conductor.

With a variable resistor arranged between the two clamps, the user can adapt the resistance of the rail shunt by adjusting the variable resistor, in particular by choosing the desired terminal of the variable resistor and obtain many different values of resistance, with a single component. There is no need for a multitude of cables, each with a different electrical resistance.

According to preferred embodiments, the inventive rail shunt has one, several or all of the following features, in all technically feasible combinations:

- the variable electrical resistor assembly comprises a variable resistor having a central supporting core, an electric current carrying wire wound around the core, and a plurality of connection terminals distributed along the length of said wire for connecting ends of said electrical conductor to predetermined portions of said wire and thus for setting the resistance value of the variable resistor;
- the core is a preferably metallic plate, and the wound wire is electrically insulated from said plate by at least one electrically insulating member placed between said plate and said wire;
- the variable electrical resistor assembly comprises a housing accommodating said variable resistor;
- the wire is made of a material whose resistivity remains essentially constant over a temperature range of −25° C. to +85° C., such as constantan;
- the variable electrical resistor assembly is adapted for adjusting the electrical resistance of the rail shunt between 0 and around 2.5 Ohm;
- the electrical conductor comprises a first electrical cable electrically connecting one clamp to the variable electrical resistor assembly, and a second electrical cable electrically connecting the variable electrical resistor assembly to the other clamp;
- the magnetic device is a set of individual magnets, preferably made of neodymium, arranged inside the magnetic clamp;
- each magnetic clamp has a magnet receiving plate for receiving said magnets and a cover plate covering the magnet receiving plate;
- the magnet receiving plate has a plurality of magnet receiving recesses, each recess having one magnet arranged therein;
- the recesses are arranged in a single row;
- each recess is cylindrical;
- each magnetic clamp is T-shaped with a longitudinal base and a transverse head;
- each transverse head has a fastening member, such as a hole, at one of its ends for fastening an end of the electrical conductor to the magnetic clamp;
- each magnetic clamp has a handle for pulling the magnetic clamp off a railway rail.

BRIEF DESCRIPTION OF THE DRAWINGS

An embodiment of the invention will now be described in detail, with references to the attached drawings, wherein.

DETAILED DESCRIPTION OF THE PREFERRED EMBODIMENTS

The magnetic shunt 1 of the present invention is a tool that is used to test whether a track circuit installed on a railway track functions properly, i.e. is able to detect the presence of a railway vehicle on the railway track. For further details on track circuits, reference is made to the corresponding Wikipedia article.

To test a track circuit, maintenance personnel electrically short-circuits two parallel railway rails by placing the magnetic shunt 1 between the two rails. This simulates an electrical short-circuit created by a train axle on the two rails.

Figure 1:
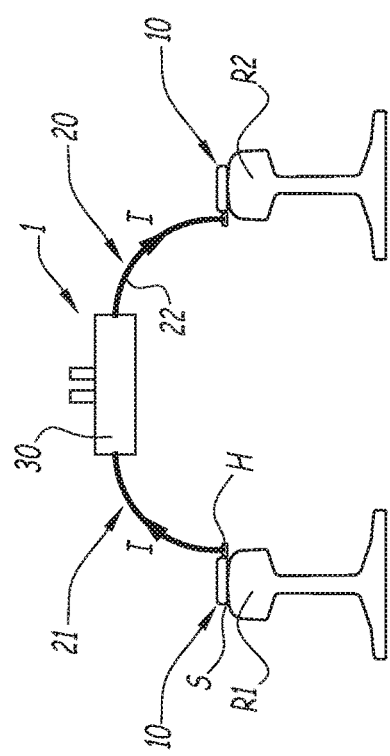
FIG. 1 is an overall view of a magnetic shunt according to an embodiment of the invention.

The magnetic shunt 1 is shown in operation in FIG. 1, between two rails R1 and R2.

The magnetic shunt 1 has three main components: a set of two magnetic clamps 10, an electrical conductor 20 and a variable electrical resistor assembly 30. The variable electrical resistor assembly 30 is connected in series between the two magnetic clamps 10 via said electrical conductor 20.

In FIG. 1, the electrical conductor 20 comprises a first electrical cable 21 electrically connecting one clamp 10 to the variable electrical resistor assembly 30, and a second electrical cable 22 electrically connecting the variable electrical resistor assembly 30 to the other clamp 10.

Current I flowing through rail R1 can cross over to rail R2 via one of the magnetic clamps 10, the first electrical cable 21, the variable electrical resistor assembly 30, the second electrical cable 22 and the other magnetic clamp 10.

Each magnetic clamp 10 has a magnetic device 11 (cf. FIG. 2) for attaching the clamp 10 to one railway rail R1 or R2 by magnetic force. Preferably, the magnetic clamps 10 are attached to the top running surface S of a rail. This is because the running surface S usually has a flat shape and is clean (due to the frequent passage of trains), allowing a good adherence of the magnetic clamp 10.

The configuration of the variable electrical resistor assembly 30 can be changed in order to adjust the electrical resistance of the rail shunt 1 to the desired value of shunt resistance to be tested.

Figure 2:
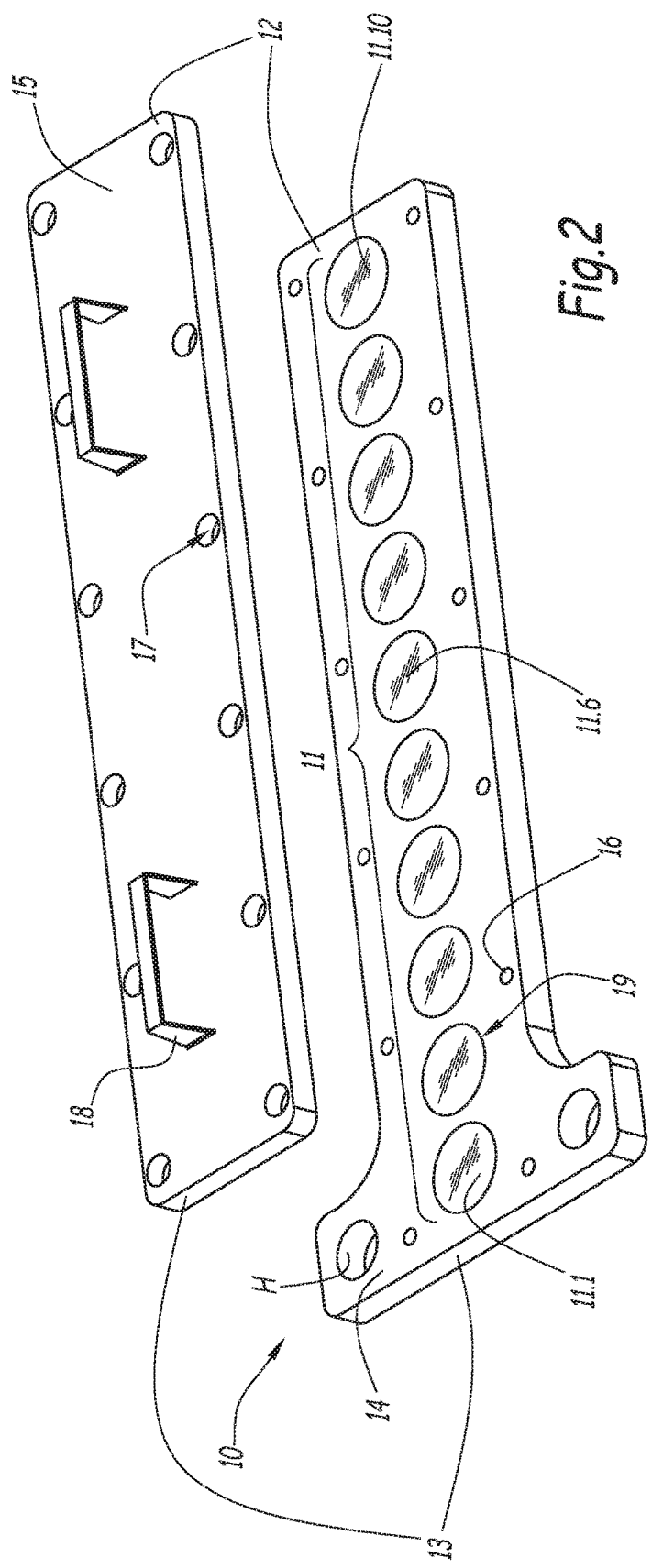
FIG. 2 is an exploded view of one of the magnetic clamps of the magnetic shunt of FIG. 1.

With reference to FIG. 2, each magnetic clamp 10 is T-shaped with a longitudinal base 12 and a transverse head 13, in order to be symmetrical. This symmetry ensures that each magnetic clamp 10 can be connected to the rails indifferently as a left clamp or a right clamp.

Each magnetic clamp 10 preferably has a size of around 300 mm×60 mm. The clamps 10 are symmetrical so that one clamp can be used on both rails of a railway track.

Each clamp 10 includes a magnet receiving bottom plate 14 and a cover plate 15 for covering the magnet receiving plate 14. Both plates 14 and 15 are made of a ferromagnetic material, such as stainless steel. The bottom plate 14 is T-shaped and the cover plate 15 is rectangular. The bottom plate 14 has a series of screw threads 16 along its length and the cover plate 15 has a corresponding series of through holes 17 for fastening the cover plate 15 to the bottom plate 14 via screws.

The cover plate 15 has one or more handles 18 for pulling the magnetic clamp 10 off a railway rail.

The bottom plate 14 accommodates the magnetic device 11. The cover plate 15 covers the magnetic device 11 to prevent it from falling out of the bottom plate 14 and to protect it from damage. The magnetic device 11 is a set of individual magnets 11.1 to 11.10. In the present example, there are ten individual magnets. Preferably, each magnet 11.1 to 11.10 is disk-shaped. One suitable material for the magnets is neodymium. Each individual magnet is received in one magnet receiving recess 19.

As shown in FIG. 2, the recesses 19 may be arranged in a single row. The recesses 19 are preferably cylindrical.

Each transverse head 13 has a fastening member, that is a hole H, at each of its ends. As shown in FIG. 1, the hole H is for fastening an end of an electrical cable 21, 22 of the electrical conductor 20 to a magnetic clamp 10.

Figure 5:
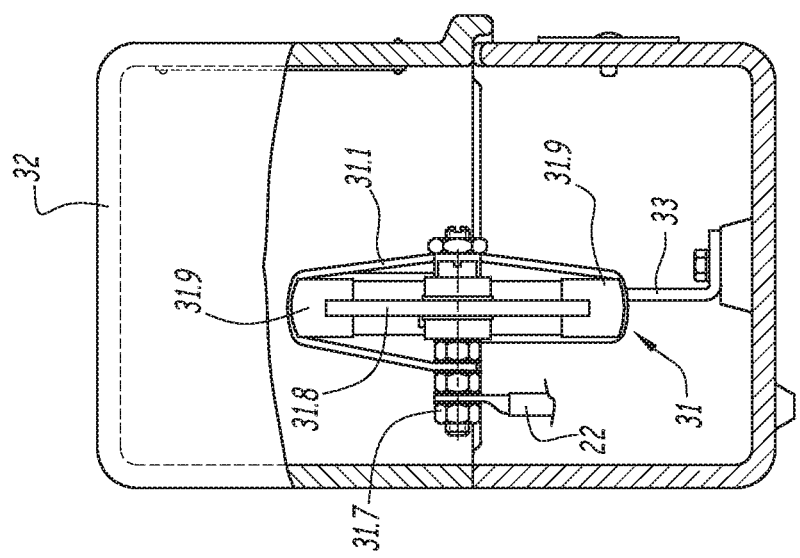
FIG. 5 is a front cross-sectional view as indicated by the cut V-V in FIG. 4.
Figure 4:
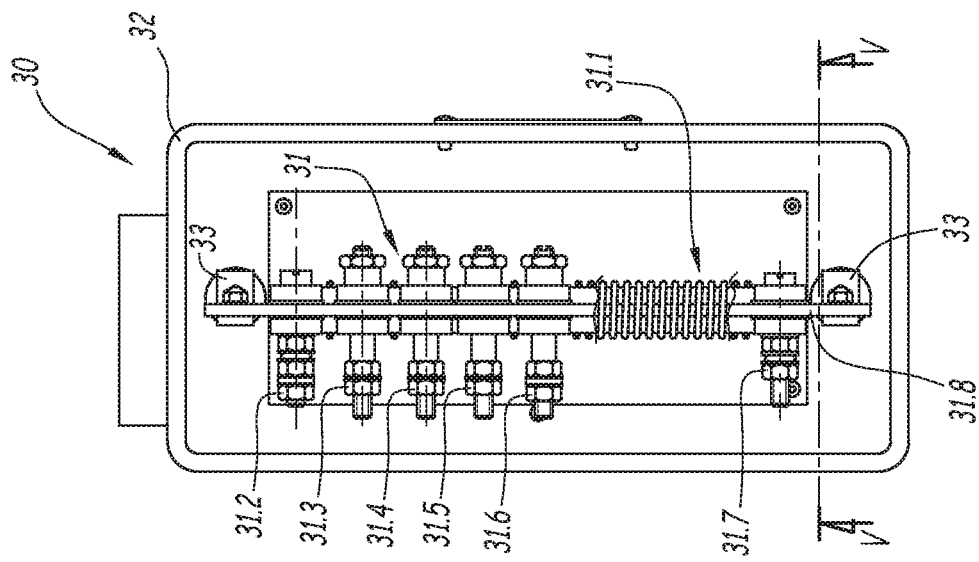
FIG. 4 is a view from above inside the variable electrical resistor assembly of the magnetic shunt of FIG. 1.
Figure 3:
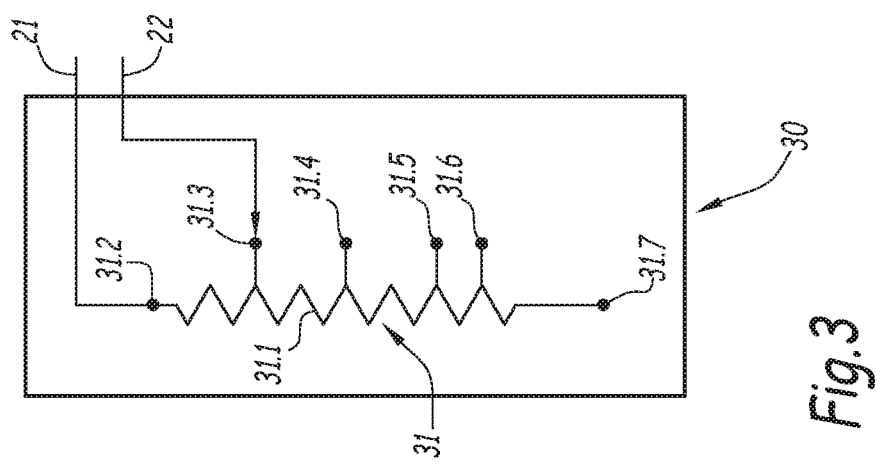
FIG. 3 is a circuit diagram of the variable resistor of the variable electrical resistor assembly of the magnetic shunt of FIG. 1.

With reference to FIGS. 3 to 5, the structure of the variable electrical resistor assembly 30 will now be described.

Turning first to FIG. 3, the assembly 30 includes a variable resistor 31 with a resistive wound wire 31.1 and a plurality of connection terminals 31.2 to 31.7 distributed along the length of the wire 31.1. One connection terminal, 31.2, acts as a fixed terminal. One end of the electrical cable 21 is fastened to the fixed terminal 31.2. One end of the other electrical cable 22 can be fastened to any of the terminals 31.2 to 31.7, thereby setting the resistance value of the variable resistor and consequently the electrical resistance of the magnetic shunt 1. Each terminal 31.2 to 31.7 corresponds to a different resistance value. For example, by fastening the other electrical cable 22 to the appropriate terminal, the resistance can be set to 0, 0.25, 0.5, 0.75, 1 or 2.5 Ohm. Other resistance values can be achieved by using different pairs of terminals. For example, 1.5 ohm can be obtained by connecting the cables to terminals 31.6 and 31.7. Preferably, the power rating of the variable resistor 31 is 300 Watts.

Of course, the number and the position of the terminals can be changed to increase or reduce the choice of resistance values.

FIGS. 4 and 5 show the actual physical structure of the variable electrical resistor assembly 30. The variable resistor 31 is located in a housing 32. It is attached to the housing 32 via supporting brackets 33. The variable resistor 31 includes a central supporting core 31.8, the resistive wire 31.1 and the connection terminals 31.2 to 31.7. The electric current carrying wire 31.1 is wound around the length of the core 31.8. The core 31.8 is preferably a metallic plate ensuring the stability and structural integrity of the variable resistor 31 and is also called supporting plate 31.8. The wire 31.1 is isolated from the supporting plate 31.8 by two electrically insulating members 31.9 of the variable resistor 31. The insulating members 31.9 are preferably shaped as bars. Each bar 31.9 is fitted onto one of the upper and lower edges of the supporting plate 31.8.

The wire 31.1 is preferably made of a material whose resistivity remains essentially constant over a temperature range of −25° C. to +85° C., such as constantan. This prevents the resistance of the magnetic shunt 1 from deviating from the set value when the electrical resistor's temperature increases due to resistive heating.

The magnetic shunt 1 is used as follows. First, each magnetic clamp 10, having one electrical cable 21, 22 fastened thereto, is attached to one railway rail R1, R2 by simply placing each clamp 10 on the running surface S. Then, the remaining free end of one electrical cable 21, 22 is fastened to the fixed terminal 31.2 of the variable resistor 31. The remaining free end of the other electrical cable 22, 21 is fastened to one of the terminals 31.2 to 31. 7 to set the resistance value of the magnetic shunt 1. Then, one can check the proper operation of the track circuit associated with the rails. Once the check is complete, each magnetic clamp 10 can be removed from the rail by pulling on the handle 18.

The magnetic shunt of the present invention has in particular the following advantages:
  The connection to and release from the rails is quick without the need for any tools;
  The shunt is lightweight and compact;
  It has a good surface contact to the rails and therefore the contact resistance of the clamps can be neglected in the shunt measure;
  It can reproduce a variety of different resistances corresponding to different types of train axles;
  Switching between different resistance values is straightforward. One only needs to reposition one cable end;
  The magnetic shunt is not affected by aging or wear, because no screws are used to connect it to the rails as the typical shunts do;
  It can operate in an extended range of temperature and power ratings without changing its properties.

What is claimed is:

1. A magnetically clampable rail shunt, comprising:
   two magnetic clamps, each clamp having a magnetic device for attaching the clamp to one of two parallel railway rails of a railway track by magnetic force;
   an electrical conductor electrically connecting the two magnetic clamps for shunting the two parallel railway rails; and
   a variable electrical resistor assembly for adjusting the electrical resistance of the rail shunt, said variable electrical resistor assembly being connected in series between the two magnetic clamps via said electrical conductor,
   wherein the variable electrical resistor assembly comprises a variable resistor, which comprises:
   a central supporting core;
   an electric current carrying wire wound around the core; and
   a plurality of connection terminals distributed along the length of said wire configured to connect ends of said electrical conductor to predetermined portions of said wire, thereby setting the resistance value of the variable resistor.

2. The rail shunt of claim 1, wherein the core is a preferably metallic plate, and the wound wire is electrically insulated from said plate by at least one electrically insulating member placed between said plate and said wire.

3. The rail shunt of claim 1 wherein the variable electrical resistor assembly comprises a housing accommodating said variable resistor.

4. The rail shunt of claim 1, wherein the wire is made of a material whose resistivity remains essentially constant over a temperature range of −25° C. to +85° C., such as constantan.

5. The rail shunt of claim 1, wherein the variable electrical resistor assembly is adapted for adjusting the electrical resistance of the rail shunt between 0 and around 2.5 Ohm.

6. The rail shunt of claim 1, wherein the electrical conductor comprises a first electrical cable electrically connecting one clamp to the variable electrical resistor assembly, and a second electrical cable electrically connecting the variable electrical resistor assembly to the other clamp.

7. The rail shunt of claim 1, wherein the magnetic device is a set of individual magnets.

8. The rail shunt of claim 7, wherein the set of individual magnets is made of neodymium, arranged inside the magnetic clamp.

9. The rail shunt of claim 7, wherein each magnetic clamp has a magnet receiving plate for receiving said magnets and a cover plate covering the magnet receiving plate.

10. The rail shunt of claim 9, wherein the magnet receiving plate has a plurality of magnet receiving recesses, each recess having one magnet arranged therein.

11. The rail shunt of claim 10, wherein the recesses are arranged in a single row.

12. The rail shunt of claim 10, wherein each recess is cylindrical.

13. The rail shunt of claim 1, wherein each magnetic clamp is T-shaped with a longitudinal base and a transverse head.

14. The rail shunt of claim 13, wherein each transverse head has a fastening member, such as a hole, at one of its ends for fastening an end of the electrical conductor to the magnetic clamp.

15. The rail shunt of claim 1, wherein each magnetic clamp has a handle for pulling the magnetic clamp off a railway rail.

* * * * *